Jan. 5, 1960 SVEN-OLOF KARLSSON ET AL 2,919,606
CHANGE SPEED GEARINGS, PARTICULARLY FOR MOTOR VEHICLES
Filed Sept. 10, 1954
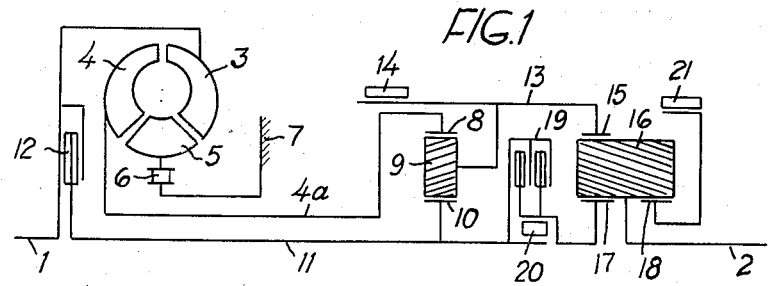
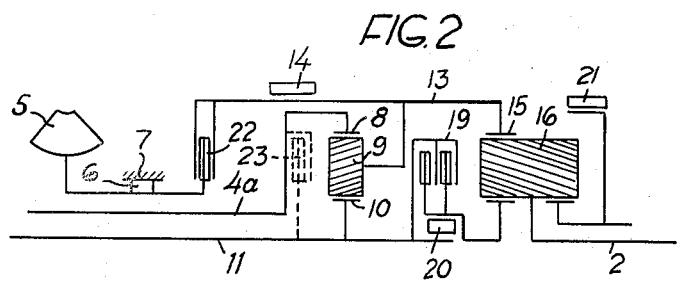
INVENTORS
Sven-Olof Karlsson
Erik Viuff Quistgaard
BY Pierce, Scheffler & Parker
ATTORNEYS

United States Patent Office 2,919,606
Patented Jan. 5, 1960

2,919,606

CHANGE SPEED GEARINGS, PARTICULARLY FOR MOTOR VEHICLES

Sven-Olof Karlsson and Erik Viuff Quistgaard, Gothenburg, Sweden, assignors to Aktiebolaget Volvo, Gothenburg, Sweden, a corporation of Sweden Application September 10, 1954, Serial No. 455,207

Claims priority, application Sweden September 10, 1953

6 Claims. (Cl. 74—688)

The present invention refers to change speed gearings, particularly for motor vehicles, wherein the torque from a driving shaft is distributed onto two intermediate shafts, and is transmitted over a planetary gearing onto a driven shaft. The invention has for its object to provide facilities with simple means for obtaining at least two forward speeds and one rearward speed. To this end, the arrangement according to the invention is principally distinguished by the feature that one of the two intermediate shafts is connected to a sun gear and the other to a ring gear in the planetary gearing, which latter comprises a total of at least four sun and ring gears and two sets of planet gears, at least one of these sets consisting of gears engaging each into at least three other gears, besides which facilities are provided to transmit a portion of, or the whole torque, over one of the two shafts. Preferably, a hydraulic torque converter should in this connection be provided between the driving shaft and one of the intermediate shafts.

The invention will be explained in the following with reference to the accompanying drawings, wherein Figs. 1 and 2 are diagrammatic representations of two forms of embodiment of the invention.

In Fig. 1, reference numeral 1 designates, for instance, the engine shaft of a motor vehicle, said shaft constituting the input shaft of a transmission gearing, the output shaft or driven shaft of which is denoted by 2. The input shaft 1 is connected to the pump wheel 3 of a hydraulic torque converter, the turbine wheel of which is designated by 4. The torque converter is provided with a guide blade rim 5 which may bear on a rigid element 7 in the torque converter over a freewheel contrivance 6.

The turbine wheel 4 is connected to a ring gear 8 in a planetary gearing, the planet gears of which are designated by 9. Associated with said planetary gearing is a sun gear 10 arranged on an intermediate shaft 11 adapted to be connected to the input shaft 1 by means of a clutch 12.

The planet gears 9 are supported by a carrier 13 formed as a drum for a brake band 14, which when pulled tight prevents the planet gear carrier 13 from rotating. Furthermore, the planet gear carrier 13 is connected to a ring gear 15 in a second planetary gearing, the planet gears 16 of which are relatively long and adapted to cooperate with two sun gears 17 and 18. The planet gears 16 are carried by the output or driven shaft 2. Of the sun gears 17, 18 the gear 17 is adapted to be coupled to the intermediate shaft 11 by means of a clutch 19, in addition to which a freewheel contrivance 20 is provided between the gear 17 and the intermediate shaft 11. The sun gear 18 is adapted to be actuated by a brake band 21 so as to be prevented from rotating.

Assuming that the vehicle is to be started from a stillstand, the brake band 21 is pulled tight. The torque will then pass over the pump wheel 3 to the turbine wheel 4 during which the guide blade rim 5 is stationary. From the turbine wheel 4, the torque passes over the turbine shaft 4a serving as an intermediate shaft onto the ring gear 8, which then tends to turn the intermediate shaft 11 rearwardly. This is prevented, however, by the freewheel 20 bearing on the sun gear 17, which is understood not to be able to rotate, inasmuch as the sun gear 18 is braked by the braking device 21 and both gears 17, 18 are meshed with the same planet gear 16. If the planet gear carrier or shaft 2 rotates, the planet gear 16 must roll around the sun gear 18 and from geometric reasons, sun gear 17 must remain stationary. The torque will thus be transmitted to the planet gear carrier 13 of the ring gear 15 and over the planet gears 16 to the output shaft 2. Hereby a torque leverage is obtained both in the hydraulic portion and in the two planetary gearings, the entire torque then passing through the hydraulic torque converter.

For a transition to an intermediate speed the clutch 12 is now thrown into engagement, whereby the input shaft is connected directly to the intermediate shaft 11. The torque is then distributed onto the latter shaft and onto the intermediate shaft 4a, the two shafts then rotating in the same direction. After the planet gears 9, the torque flux follows the same path as previously but at a reduced step-down transformation by reason of the fact that only a portion of the torque flux passes through the hydraulic torque converter, and by the fact that a mechanical transformation is obtained only in the second set of planet gears.

If the brake band 21 is now loosened and the clutch 19 is instead thrown into engagement, it will be understood that the step-down transformation will be reduced still further, inasmuch as the input shaft 1 will also be directly connected to the sun gear 17. The greater portion of the torque will pass this way, whereas a smaller operation passes over the torque converter 3—5.

With the arrangement described, three forward speeds have been obtained in the manner set forth above, said speeds permitting of being used in normal starting and driving. However, if the clutch 19 and the brake band 21 are kept engaged, whereas the other coupling elements are kept disengaged, the intermediate shaft 11 has been locked definitely due to the locking of sun gears 17 and 18. Here, the clutch 19 replaces the freewheel 20, and hereby the same ratios of gear are obtained as in the low gear used for starting as per above. However, a difference resides in that a so-called engine-brake is obtained owing to the clutch 19, inasmuch as a driving torque, if any, from the output shaft 2, for instance in rolling downhill, is obtained with returning of this torque to the engine shaft 1 over the torque converter 3—5.

Backward motion is obtained, if the brake band 14 is tightened up, while the other members of the coupling are disengaged. Here the free wheel 20 is effective, however. The whole torque passes over the torque converter 3—5 and from the ring 8 onto the sun wheel 10 and over the freewheel 20 onto the sun gear 17. Inasmuch as the ring wheel 15 is stationary, the planet gears 16 will roll rearwardly and turn the output shaft 2 rearwardly.

Fig. 2 shows a modified embodiment of the arrangement according to Fig. 1, wherein certain parts of the torque converter and so forth have been omitted. According to Fig. 2, the guide blade rim 5 is adapted to be connected to the planet gear carrier 13 by means of a clutch 22. The guide blade rim makes it possible to obtain a greater torque from the output shaft than the input shaft. Under certain conditions the output torque is the same as the input torque and the torque converter 3—5 then functions as a hydraulic coupling or clutch with a slip, the input shaft running somewhat faster than the output shaft. Such point on the efficiency curve is termed the "coupling point." Such point will be moved if the guide blade rim is caused to rotate in the same direction as the turbine element of the converter by connecting the rim 5 to planet carrier 13 by clutch 22, as explained. A torque transformation and efficiency process is then obtained similar to that obtained in connection with double rotation. However, as the guide blade rim will then rotate in the same direction as the turbine but at a lower speed than the latter. This affects the process of flow in the hydraulic torque converter, in a manner such that a lower starting ratio will be obtained with a forwardly rotating guide blade rim, whereas a higher coupling point is obtained than with a stationary blade wheel rim. The construction permits of an improvement of the effective work as well as of engine and hydraulic braking.

Fig. 2 also shows by dash lines a clutch 23 between the intermediate shafts 4a and 11. With the clutch 12 thrown into engagement between the engine shaft 1 and the intermediate shaft 11, and with the clutch 23 thrown into engagement, the entire change speed gearing will rotate as a unit, a direct and rigid coupling being thus obtained between the engine shaft 1 and the output shaft 2.

It holds true for all embodiments shown and described above that two sets of planet gears and in total at least four sun and ring gears are available, the wheels of one set then being in engagement with at least three other gears, which condition makes it possible to distribute the torque flux in an advantageous manner over the intermediate shafts and, with the use of a hydraulic torque converter, to disengage the latter, wholly or in part, in normal driving, which brings about an improved efficiency. However, the input planetary gearing does not necessarily presuppose the existence of a hydraulic torque converter. Also, the invention is not otherwise tied to the arrangements shown, but may be varied within the scope of the appended claims.

What we claim is:

1. In a change speed gearing particularly adapted for use in motor vehicles for transmitting torque from a driving shaft to a driven shaft, the combination comprising independently rotatable first and second intermediate shafts, a first planetary gearing comprising a sun gear, a ring gear and planet gears carried by a carrier, said first intermediate shaft being connected to said sun gear and said second intermediate shaft being connected to said ring gear of said first planetary gearing, a second planetary gearing comprising at least one sun gear, a ring gear and planet gears carried by a carrier, the carrier of said first gearing being connected to the ring gear of said second gearing and the carrier of said second gearing being connected to said driven shaft, a releasable clutch connected intermediate said first intermediate shaft and the sun gear of said second planetary gearing, and brake means for the carrier of said first planetary gearing.

2. A change speed gearing as defined in claim 1 and further including a releasable clutch connected between said first and second intermediate shafts.

3. A change speed gearing as defined in claim 1 wherein the planetary gears of said second planetary gearing are elongated, and wherein said second planetary gearing further includes a second sun gear, and brake means for braking the rotation of said second sun gear.

4. In a change speed gearing particularly adapted for use in motor vehicles for transmitting torque from a driving shaft to a driven shaft, the combination comprising independently rotatable first and second intermediate shafts, a first planetary gearing comprising a sun gear, a ring gear and planet gears carried by a carrier, said first intermediate shaft being connected to said sun gear and said second intermediate shaft being connected to said ring gear of said first planetary gearing, a second planetary gearing comprising at least one sun gear, a ring gear and planet gears carried by a carrier, the carrier of said first gearing being connected to the ring gear of said second gearing and the carrier of said second gearing being connected to said driven shaft, a releasable clutch connected intermediate said driving shaft and said first intermediate shaft, and a hydraulic torque converter connected intermediate said driving shaft and said second intermediate shaft.

5. A change speed gearing as defined in claim 4 wherein said torque converter includes a rotatable guide blade rim and wherein a releasable clutch is provided between said guide blade rim and said carrier of said first gearing.

6. A change speed gearing as defined in claim 4 and further including a releasable clutch connected intermediate said first and second intermediate shafts.

References Cited in the file of this patent

UNITED STATES PATENTS

| | | |
|---|---|---|
| 2,156,041 | Duffield | Apr. 25, 1939 |
| 2,277,214 | Dodge | Mar. 24, 1942 |
| 2,312,849 | Pollard | Mar. 2, 1943 |
| 2,334,394 | Dodge | Nov. 16, 1943 |
| 2,551,746 | Lavelli | May 8, 1951 |
| 2,606,460 | Kelley | Aug. 12, 1952 |
| 2,616,308 | Burnett | Nov. 4, 1952 |
| 2,616,312 | Jandasek | Nov. 4, 1952 |
| 2,640,373 | Jandasek | June 2, 1953 |
| 2,645,137 | Roche | July 14, 1953 |
| 2,651,950 | Schou | Sept. 15, 1953 |
| 2,679,768 | Baule | June 1, 1954 |
| 2,703,500 | Roche | Mar. 8, 1955 |
| 2,706,419 | Kelbel | Apr. 19, 1955 |
| 2,734,399 | Christenson | Feb. 14, 1956 |
| 2,738,689 | Dodge | Mar. 20, 1956 |

FOREIGN PATENTS

| | | |
|---|---|---|
| 513,764 | Belgium | Sept. 15, 1952 |

UNITED STATES PATENT OFFICE

CERTIFICATE OF CORRECTION

Patent No. 2,919,606                                                 January 5, 1960

Sven-Olof Karlsson, now by change
of name, Sven-Olof Kronogard, et al.

It is hereby certified that error appears in the above numbered patent requiring correction and that the said Letters Patent should read as corrected below.

In the grant, line 1, in the heading to the drawing, line 1, in the signature to the drawing, and in the heading to the printed specification, line 4, name of the first inventor, for "Sven-Olof Karlsson", each occurrence, read --- Sven-Olof Karlsson, now by change of name, Sven-Olof Kronogard ---.

Signed and sealed this 31st day of May 1960.

(SEAL)
Attest:

KARL H. AXLINE
Attesting Officer

ROBERT C. WATSON
Commissioner of Patents